US012374035B1

(12) United States Patent
Lopez et al.

(10) Patent No.: US 12,374,035 B1
(45) Date of Patent: Jul. 29, 2025

(54) METHOD AND SYSTEM FOR VIRTUAL RECONSTRUCTION OF ACCIDENTS

(71) Applicant: UIPCO, LLC, San Antonio, TX (US)

(72) Inventors: Mark Anthony Lopez, Helotes, TX (US); Nina Cooper, San Antonio, TX (US); David Patrick Dixon, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 1065 days.

(21) Appl. No.: 17/364,400

(22) Filed: Jun. 30, 2021

(51) Int. Cl.
| | | |
|---|---|---|
| *G06N 20/00* | (2019.01) | |
| *G06F 40/205* | (2020.01) | |
| *G06N 5/046* | (2023.01) | |
| *G06T 13/20* | (2011.01) | |
| *G06T 17/00* | (2006.01) | |
| *G07C 5/00* | (2006.01) | |

(52) U.S. Cl.
CPC ............ *G06T 17/00* (2013.01); *G06F 40/205* (2020.01); *G06N 5/046* (2013.01); *G06N 20/00* (2019.01); *G06T 13/20* (2013.01); *G07C 5/008* (2013.01)

(58) Field of Classification Search
CPC ....... G06T 17/00; G06T 13/20; G06F 40/205; G06N 5/046; G06N 20/00; G07C 5/008
USPC .............................................................. 703/6
See application file for complete search history.

(56) References Cited

U.S. PATENT DOCUMENTS

2006/0253245 A1* 11/2006 Cera .................... G06F 3/04815
701/533
2022/0324484 A1* 10/2022 Hruschka .......... B60W 30/0956

OTHER PUBLICATIONS

Jones, Dean J., and Gunjan Mansingh. "Identifying Corroborated and Contradicted Claims Among Witness Statements Using Post-Hoc Collective Intelligence." 2018 IEEE 5th International Congress on Information Science and Technology (CiSt). IEEE, 2018 (Year: 2018).*

* cited by examiner

*Primary Examiner* — John E Johansen
(74) *Attorney, Agent, or Firm* — Plumsea Law Group, LLC

(57) ABSTRACT

A system and method for generating simulations of a vehicular accidents and detecting inconsistencies between different sources of data for the accidents are disclosed. The system obtains reports and other data describing the accident and processes the information for use by a keyword model. The keyword model is configured to detect terms in the data that are more likely to provide insight into the accident. The keywords are provided to a generative engine that is configured to generate a simulation of the accident based on visual elements corresponding to the keywords. In some cases, the simulation may include an animated video and/or a 3D model of the accident. Individual simulations may be generated for each source of data obtained. The simulations can then be compared to detect potential inconsistencies.

20 Claims, 12 Drawing Sheets

METHOD AND SYSTEM FOR VIRTUAL RECONSTRUCTION OF ACCIDENTS

TECHNICAL FIELD

The present disclosure generally relates to systems for simulating car accidents based on witness accounts, and in particular to systems for processing evidence about an accident involving a vehicle and generating virtual reconstructions of the accident based on the evidence.

BACKGROUND

Following an accident, a driver may or may not call their insurance carrier immediately to provide details about the accident. When an accident is reported to the insurance carrier, it is typically a very time-consuming process. In addition, the driver may forget or misremember details about the accident, leading to an inaccurate assessment of damage. The driver may also be in a physical or mental state that prevents them from providing accurate details about incidents before, during or after the accident, and inconsistencies in the report may delay the processing of the claim. In some cases, claimants may provide details that are inconsistent to the damage or injuries reported, but these details may be overlooked by an investigator when reviewing the case. In addition, the insurer may not necessarily be able to distinguish all of the significant details about the accident from the driver's report. The representative of the insurance carrier may therefore obtain an inaccurate understanding of how the accident occurred and what damage has occurred to the vehicle. This inaccuracy can lead to inaccurate damage estimates, multiple inspections, as well as additional costs to both the insurance provider and the driver in some cases.

There is a need in the art for a system and method that addresses the shortcomings discussed above.

SUMMARY

In one aspect, a computer-implemented method identifying inconsistencies between different sources of data for a vehicle accident is disclosed. The method includes a first step of receiving first data including a testimony of a witness to the accident and a second step of receiving second data including information about the accident from a source other than the witness. A third step includes performing natural language processing (NLP) on the first data. A fourth step includes providing the processed first data to a keyword machine learning model to extract one or more terms detected in the first data that are associated with high degree of relevance for the accident. In addition, the method includes a fifth step of feeding the extracted terms to a generative engine to generate a first simulation of the accident based on elements represented by the extracted terms. A sixth step includes determining a first feature of the first simulation is inconsistent with information included in the second data, and a seventh step includes causing, via a software application, a notification to be presented indicating that the first data includes information that is inconsistent with respect to the second data.

In another aspect, a computer-implemented method of determining a likelihood of reliability (or unreliability) of witness testimony of an accident is disclosed. The method includes a first step of receiving first data including a testimony of a witness to the accident, the testimony describing damage incurred by a vehicle involved in the accident, and a second step of providing the first data to a predictive model. A third step includes determining, via the predictive model, predicted damage to a vehicle that should have resulted from the accident based on the information included in the first data, and a fourth step includes providing the first data and the predicted damage to an inconsistency detection model. The method also includes a fifth step of determining, via the inconsistency detection model, that vehicle damage communicated by the first data has a high likelihood of unreliability, and a sixth step of causing, via an application, an alert to be presented indicating the high likelihood of unreliability associated with the first data.

In another aspect, a system for generating a computer-implemented simulation of aspects of a vehicle accident includes a processor and machine-readable media including instructions which, when executed by the processor, cause the processor to receive first data including a testimony of a witness to the accident and receive second data including information about the accident from a source other than the witness. The instructions also cause the processor to perform natural language processing (NLP) on the first data, and provide the processed first data to a keyword machine learning model to extract one or more terms detected in the first data that are associated with high degree of relevance for the accident. In addition, the instructions cause the processor to feed the extracted terms to a generative engine to generate a first simulation of the accident based on elements represented by the extracted terms, determine a first feature of the first simulation is inconsistent with information included in the second data, and cause, via an application, a notification to be presented indicating that the first data includes information that is inconsistent with respect to the second data.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide a system and method for generating a static or animated video and/or a three-dimensional model (i.e., "3D model") of an accident involving one or more vehicles. The virtual representations can be constructed from data retrieved from claimant testimony as well as eyewitness testimony and police reports, vehicle telemetry, images, and other data obtained from or about the site of the accident. For example, in some embodiments, the disclosed systems can apply one or more machine-learning models to analyze claimant testimony about an accident and then automatically generate 2D or 3D images of key words as graphic elements, such as vehicles, drivers, passengers, and the surrounding environment. In some cases, the embodiments of the proposed systems can be configured to arrange the elements in space based on key word analysis, thereby rendering a schematic scene of the accident according to the testimony. The model can also demonstrate damage done to the vehicle(s) following the collision. In addition, in some embodiments, the system can be configured to detect inconsistencies between witness reports of the accident and vehicle telemetry and/or images taken of the accident.

Furthermore, in some embodiments, the scene generated by the model can be animated. The simulation can be further enhanced by the use of generative image modeling techniques. For example, in some embodiments, the disclosed systems include a generative animation and model engine that can be used to build an animated video and/or associated 3D model that simulates the accident. The simulation can then be viewed by other parties, such as an insurance agent, for the purposes of gathering details about an accident. Thus, the proposed systems are able to capture a great deal of information from an accident and build a robust animation or 3D model that can be easily understood by the driver as well as other parties. In some embodiments, the animated video and/or model can also be used to assess the severity of the accident and determine if the reported damage and/or injury is consistent with the type of accident that occurred.

This generated information can be used by interested parties to better understand the location of impact and the damage to the vehicles, as well as about how the crash occurred. For example, by identifying the various points of damage on the automobile, an investigator can work backward to determine how the accident may have happened. In some cases, the damage depiction can significantly affect the results of an insurance or civil claim, underscoring the need for accurate representation of the damage. In other cases, the vehicle damage can allow the investigator to rule out ways that the accident could not have occurred. This type of visual representation of the accident report details can offer insights and clarity regarding the incident that are far greater than what conventional case reviews can provide.

Figure 1A:
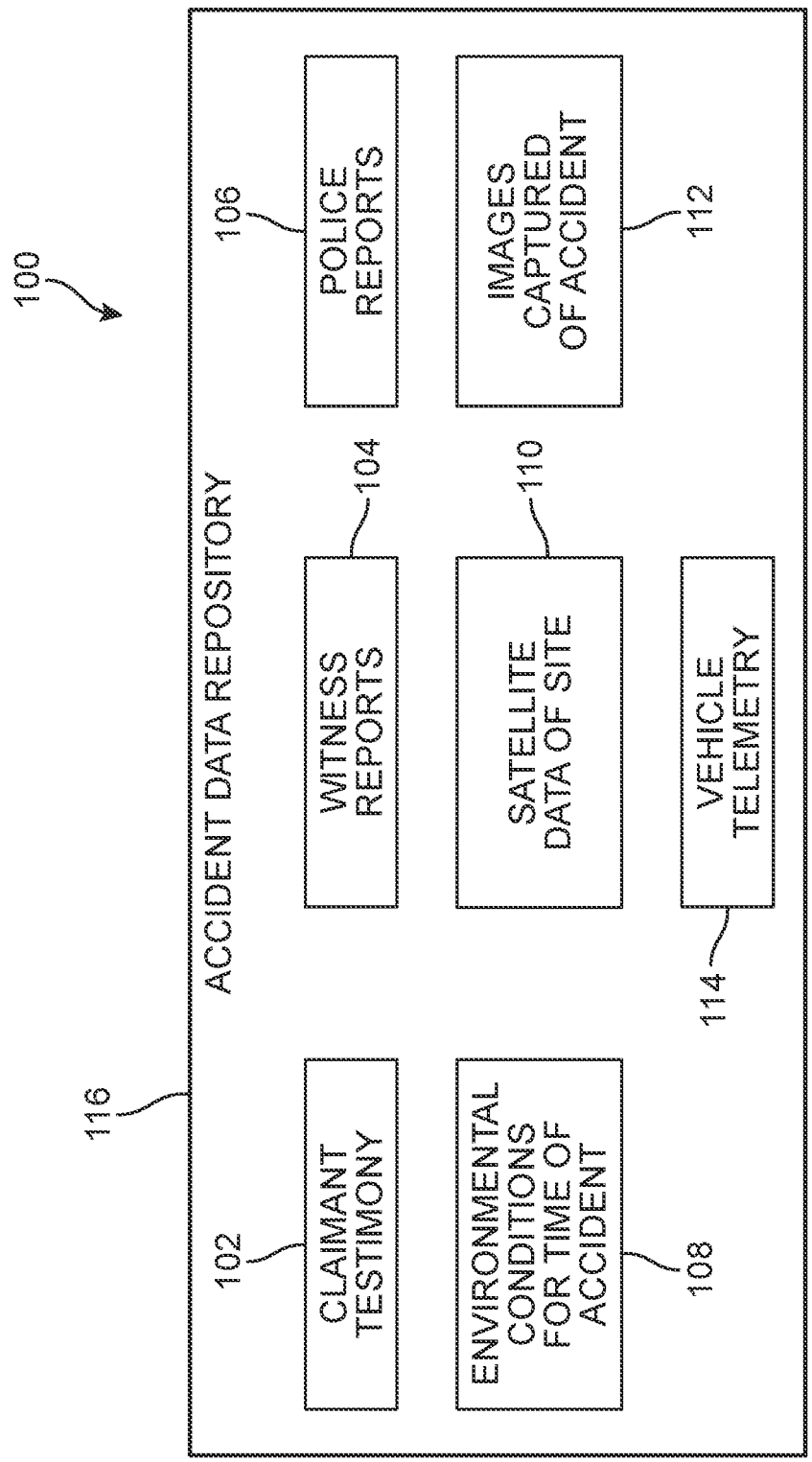
FIG. 1A is a schematic diagram of various types of data that may be collected about a vehicular accident, according to an embodiment.
Figure 1B:
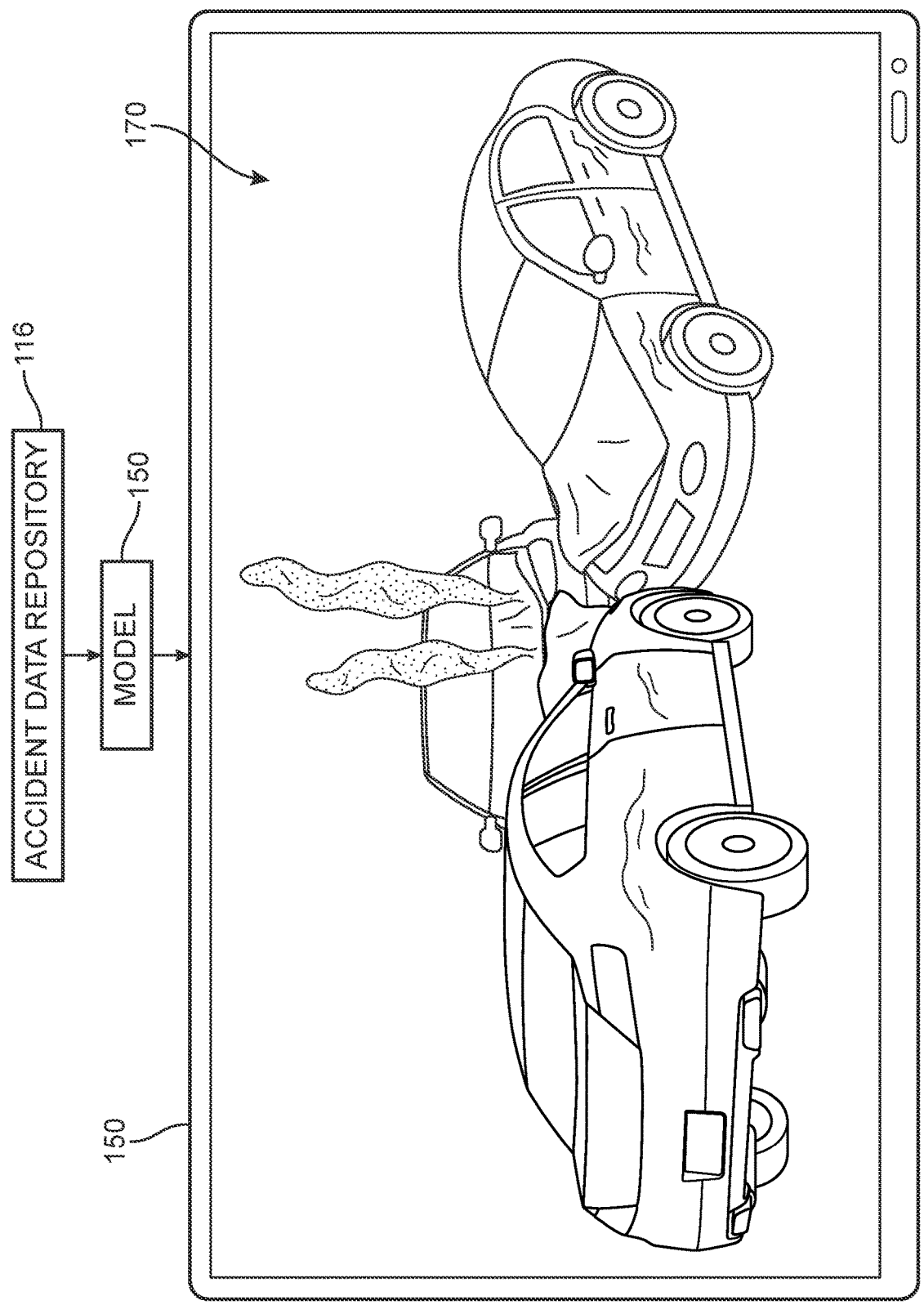
FIG. 1B is an illustration of an accident simulation output as produced by a generative engine, according to an embodiment.

For purposes of introduction, an overview of one embodiment of the proposed systems and methods is illustrated with reference to FIGS. 1A and 1B. In FIGS. 1A and 1B, an embodiment of an accident simulation system ("system") implemented via a computing device is depicted. In FIG. 1A, some example data 100 that might be collected after an accident are shown. These data 100 can include claimant testimony 102, which refers to the description of the accident as provided by the claimant (usually the driver of one of the vehicles involved in the accident). In addition, if any other persons were present at the time of the accident, witness reports 104 may be obtained. Furthermore, if the police were called or were otherwise involved, police reports 106 of the accident can be used. In some embodiments, additional types of data that generally offer a more impartial perspective may be included (where available) such as (1) environmental conditions 108 for the time of the accident, which can include weather, construction, etc.; (2) satellite or other aerial data 110 of the site may also be included in order to confirm the geographical features and roadways; (3) in areas where cameras may be present at the accident site, or may be available from a vehicle's dashcam or a witness's cell phone, a wealth of image data 112 can be used; and/or (4) telemetric data 114 from one of the vehicles involved in the accident. For example, telemetric data may not only identify a vehicle's location but also measure velocity, detect principal direction of force, determines airbag deployment, and identifies the occurrence of multiple collisions or rollover, as well as other crash (and pre-crash) characteristics, which can be used to provide information on the likelihood of severe injury and/or vehicle damage.

These and other data providing a context for the accident can be collected and, for example, stored in an accident data repository 116. Referring next to FIG. 1B, in one embodiment, such details can be submitted to a model 150 that is configured to automatically generate a virtual representation 170 of the event, for example in a display 160 for a computing device. The virtual representation 170 can refer generally to a visual reconstruction of the event or aspects thereof. In some embodiments, the virtual representation 170 can include the outcome of the accident (where the vehicles were positioned and the damage they sustained following the collision), while in other embodiments, additional pre-collision reconstruction may be depicted, such as the seconds or minutes immediately preceding the accident. As will be discussed in greater detail below, each of the various sources of input (see FIG. 1A) can be processed and evaluated. The weight assigned to each source may vary depending on the degree to which that input is believed to be reliable. In some other embodiments, different versions of the event may be generated when two of the sources conflict, or a message may alert the reviewer of the inconsistency.

Figure 2A:
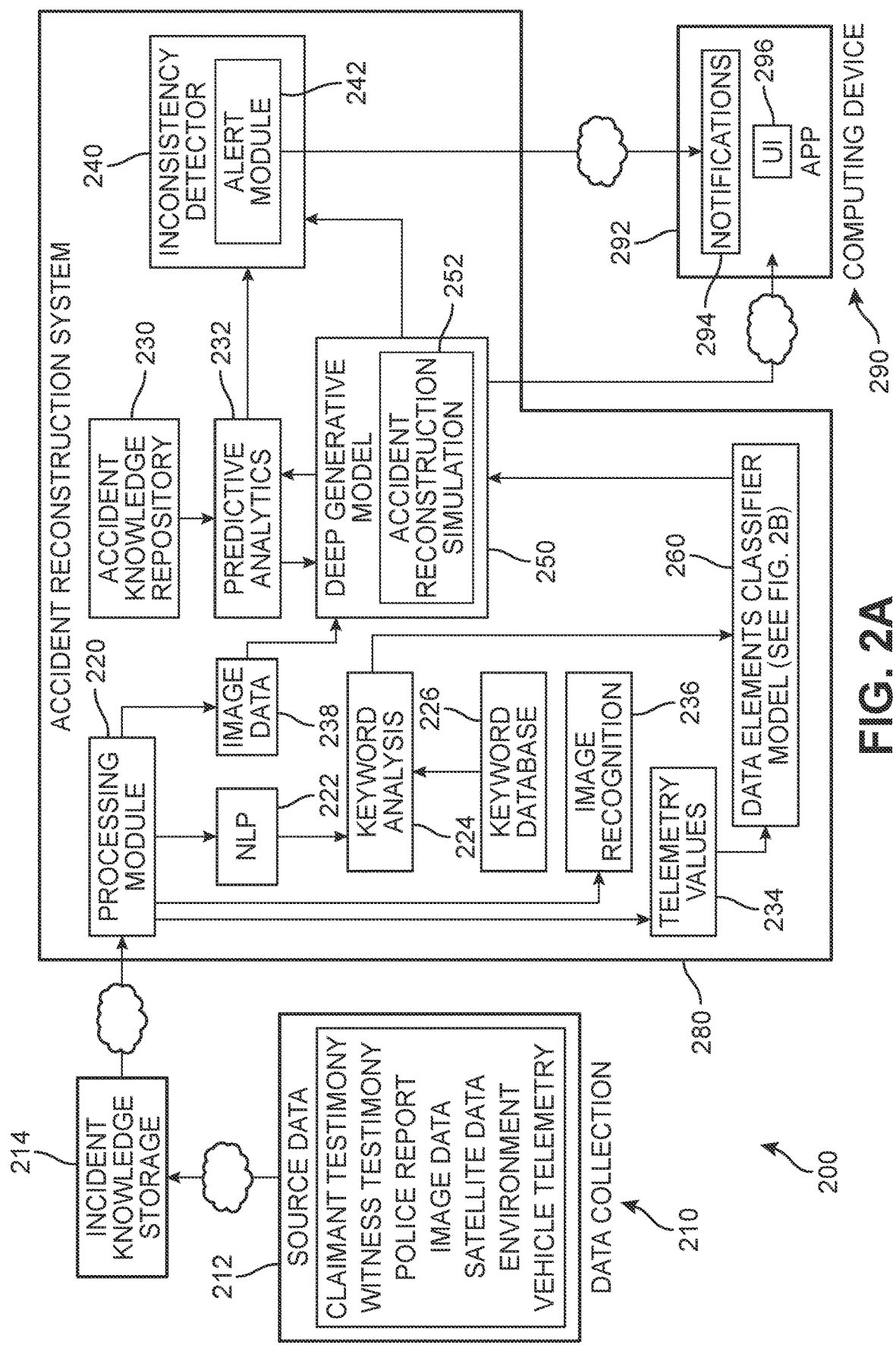
FIGS. 2A and 2B are a schematic diagram of a system for generating a simulation of a vehicular accident, according to an embodiment.
Figure 2B:
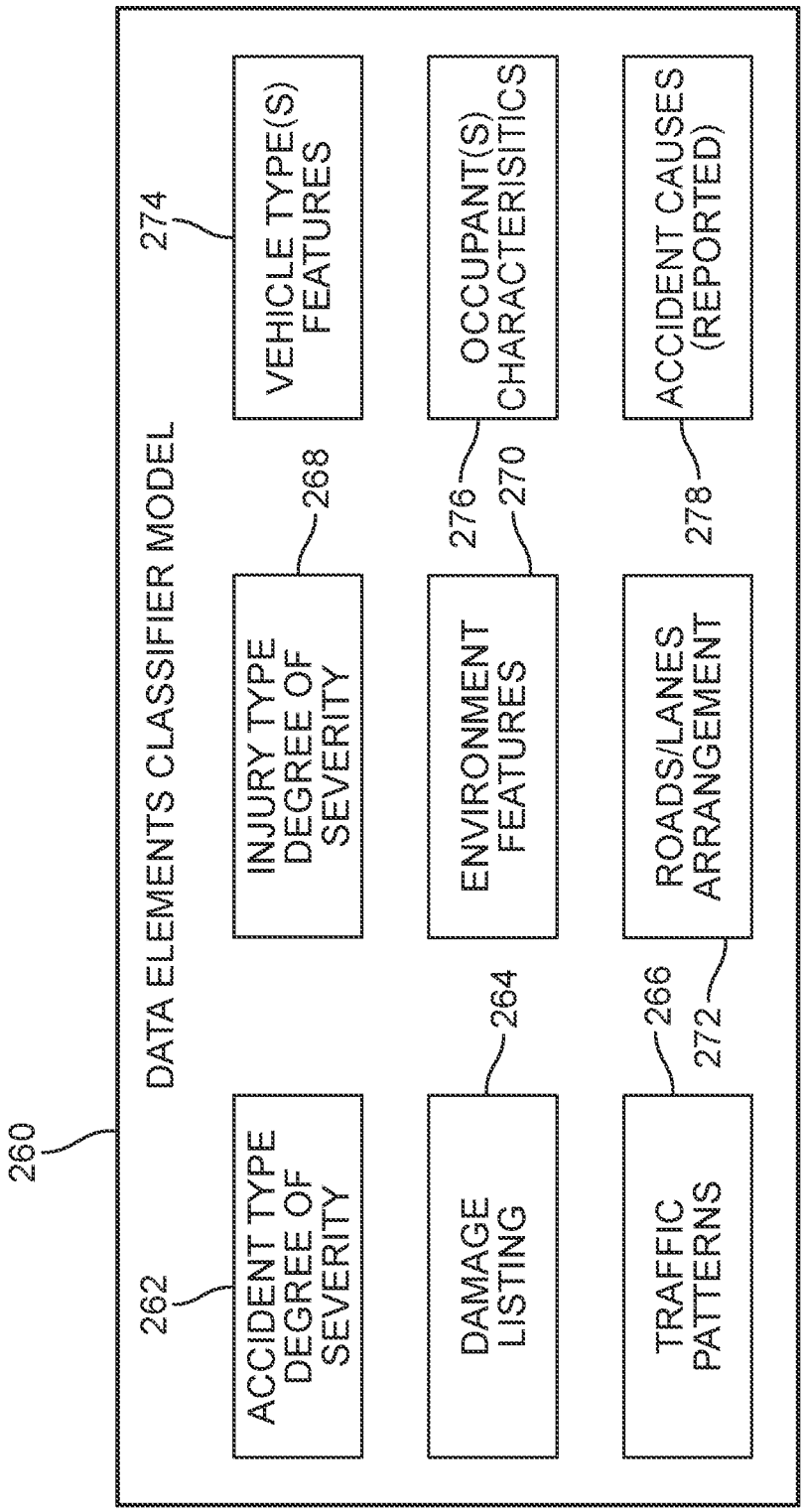

Referring now to FIGS. 2A and 2B, an overview of an embodiment of a data flow environment 200 for implementing the systems and methods disclosed herein is depicted. The environment represents a process and system for capturing and processing data about an accident event, for example to improve the speed of assessing vehicle damage and facilitating claim processing. In different embodiments, some of the steps may be performed by cloud-based computing system(s) and some of the steps may be performed by local system(s).

In different embodiments, a data collection module 210 may represent an entry point whereby multiple sources of data 212 may be received and optionally stored in an incident knowledge storage module 214. In some embodiments, the incident knowledge storage module 214 can be part of an accident reconstruction system ("system") 280, while in other embodiments, the incident knowledge storage module 214 resides outside of system 280. In other embodiments, the incident knowledge storage module 214 is bypassed and source data 212 is directly inputted into system 280. In different embodiments, the source data 212 itself may comprise various types of information, as discussed above. As some non-limiting examples, source data 212 can include claimant testimony, witness testimony, police reports, image data, satellite data, environmental conditions and features, and/or vehicle telemetry, etc. Each type of source data may also be referred to as an information component. For purposes of this disclosure, a witness may include the claimant and/or a driver or other occupant of a vehicle. This data can be submitted as videos, images, audio, and documents. In some embodiments, the system 280 can be configured to analyze information in other data formats.

As information from source data 212 is provided to system 280, the source data 212 can be optionally filtered and preprocessed by a processing module 220. In some embodiments, the system 280 can convert audio or other spoken information to text via speech processing systems. In different embodiments, data processing can include any suitable technique for optical character recognition (OCR), optical word recognition (OWR), intelligent character recognition (ICR), intelligent word recognition (IWR), natural language processing (NLP), machine learning, parsing, and/or other techniques for identifying particular text elements or other data elements in the text.

In the embodiment of FIG. 2A, the system 280 performs natural language processing 222 on the data to interpret the language, for example by parsing sentences, and determining underlying meanings of the text. Embodiments can make use of any techniques already known in the field of natural language processing (NLP). These include any techniques in speech recognition and natural language understanding. As one non-limiting example, the system 280 can include the computing resources to conduct natural language processing (NLP) on received speech audio files. For example, the NLP applied by the system 280 may include machine translation of the received speech audio files to obtain a translation of the speech captured by the received speech audio files into written text. The machine translated text may then be analyzed according to one or more NLP analyses such as text summarization and/or sentiment analysis. The NLP analyses may comprise implementing sentence breaking rules on the machine translated text to break up the text into smaller chunks of text such as paragraphs and individual sentences. The NLP analyses may further comprise tagging parts of speech identifiers (e.g., noun, verb, article, adjective) to the words that comprise a chunk of text. The NLP analyses may further comprise parsing the text to create one or more parsing tree that outline different possible interpretations for a chunk of text. The NLP analyses may further comprise terminology extraction that extracts one or more key terms from a chunk of text to better understand the context of the text. The NLP analyses may further comprise language translation capabilities to translate text from one language to another.

In different embodiments, results of the NLP 222 are provided to a keyword analysis module 224 that can make reference to a keyword database 226. The keyword database 226 can include, but not limited to, specific words or phrases that are known to be associated with a particular aspect, feature, or other detail of the accident event, and should therefore be tagged as having potentially greater relevance. For example, words such as "hit", "run", "dent", "broken", "rear bumper", "back of the car", "window", "passengers", "Stop sign", "traffic light", "crash", "concussion", or other descriptors regarding the vehicle condition, passenger/driver condition, environment, events leading to the incident, etc. that may offer information about the accident may be flagged by keyword analysis module 224.

In some embodiments, machine vision, image recognition, and/or related analysis can be used to assess nonverbal/non-textual elements of source data 212. In the example of FIG. 2A, in cases where source data 212 includes images or video, the processing module 220 may submit such data to an image recognition module 236. Image recognition module 236 may, for example, apply a convolutional neural network. In another example, computer learning may be used to recognize image elements such as structures, vehicle parts, persons, environmental features, etc. The image processing may use GPS data or other geolocation data. The computing device may recognize one or more positions or features in the image data, such as based on shapes, patterns, or colors of the image data. In the case of video data, the image recognition module 236 may determine one or more positions or features in the sequence of images that are associated with the one or more positions or features in the first image data, providing a route for an object through the sequence. As another illustrative example, the system may recognize a feature of a vehicle, such as a roof, a trunk, or a door, for example. The system may be taught to recognize features or positions by a machine learning algorithm trained with accident-specific data. In some embodiments, a telemetry values module 234 can also decode if needed and organize telemetry data shared from one or more vehicles in the accident. Some non-limiting examples of telemetry data that may be collected from the onboard diagnostics (OBD) system of a vehicle include speed of travel, ambient weather, road conditions, traffic conditions, images of the vehicle and/or nearby vehicles before the accident, images of the vehicle after the accident, force and location of impact, internal and ambient audio, telematics data, and/or occupant information. An OBD system may track and process various vehicle sensor information. In some cases, one or more systems of a vehicle could retrieve sensory data from the OBD system rather than directly from the sensors themselves. In some embodiments, an onboard diagnostics system could be used with a telematics device that receives information from the OBD to track and store various kinds of data in an ongoing manner. In such cases, other systems, such as the system described herein, can communicate with a telematics device. Of course, it may be appreciated that this is not an exhaustive list of the kinds of data that can be received, and that any other kinds of data provided by any of the sources described above may also be used as inputs.

As shown in FIG. 2A, keyword analysis module 224 and, in some cases, NLP 222, as well as image recognition module 236 and telemetry values module 234, can each share their output with a data elements classifier model ("classifier model") 260. The classifier model 260 is configured to receive the keywords and classified images or telemetry and assign one or more labels to them. In other words, each detail will be assigned at least one type of data element class based on the meaning of the keyword (or phrase). As shown in FIG. 2B, some non-limiting examples of such classifications include but are not limited to (1) accident type and degree of severity 262 (e.g., telemetry data, keywords such as "rear-ended", "T-boned", "ran Stop sign", "hit and run", "totaled", "still drivable", "fire", "dent", "scratch", "broken", "flat", "drifted", "miles per hour", "speeding", "drunk", "[vehicle part]" etc.); (2) damage listing 264 (e.g., telemetry data, keywords such as "bumper", "windshield", "door", "window", "hood", "[vehicle part]", etc.); (3) traffic patterns 266 (e.g., police report, satellite data, keywords such as "right-turn only", "rush hour", "one-way", "two lanes", "stop and go", "school zone", "highway", etc.); (4) injury type and degree of severity 268 (e.g., police report, keywords such as "broken", "scratch", "hospital", "ambulance", "stitches", "[body part]", etc.); (5) environment features 270 (e.g., weather data, keywords such as "trees", "rain", "sunny", "night", "muddy", etc.); (6) road/lanes arrangement 272 (e.g., satellite data, GPS data, keywords such as "construction", "one-way", etc.); (7) vehicle type(s) and features 274 (e.g., telemetry data, image data, police report, keywords such as "SUV", "minivan", "truck", etc.); (8) occupant(s) characteristics 276 (e.g., police report, image data, keywords such as "man", "woman", "child", "glasses", "elderly", "injured", etc.); and accident causes (reported) 278 (e.g., police report, telemetry data, keywords such as "ran red light", "cell phone", "speeding", "wrong way", etc.). It should be understood that these categories and examples are for illustrative purposes, and other classifications may be applicable or implemented in the scope of the embodiments.

In some embodiments, system 280 further includes or has access to a damage predictive analysis model ("predictive model") 232. In different embodiments, the predictive model 232 is configured to receive data from NLP 222 and/or keyword analysis module 224 in order to identify specific details that support a particular accident event or scenario. In other words, predictive model 232 is configured to determine what the most likely accident outcome (e.g., damage) should be based on the details or "story" received about what led to the accident. In some embodiments, to further assist in the predictive analyses, the predictive model 232 may include, or have access to, databases of relational information, shown in FIG. 2A as an accident knowledge repository 230. The relational information may, for example, take the form of knowledge graphs that correlate relational information to specific keyword entities or topics. For example, for a particular vehicle brand or model that is involved in the accident, the corresponding knowledge graph may include branches identifying the structural features of the car model and/or the safety features (e.g., airbag, telemetry system, driver alerts, etc.). As another non-limiting example, for a particular roadway, the knowledge graph (or other database repository) may include branches for the lane arrangement on that road, when construction or other repairs have been performed on that road, the frequency of accidents that have occurred along that road, and/or the lighting, signage, street signals for that road, etc., as well as other information related to the road.

The predictive model 232 can access this type of information and generate an expected or most likely outcome of the incident. This output, along with the output of classifier model 260, is shared as inputs with a deep generative model 250, which also receives image data 238. Based on one or more of these inputs, deep generative model 250 will produce an accident reconstruction simulation ("simulation") 252. In different embodiments, the simulation 252 can vary widely in detail, depending on the quality and quantity of source data 212. In some embodiments, deep generative model 250 applies one or more of generative multi adversarial nets (GMAN) and conditional generative adversarial nets (CGAN), as well as other image synthesis techniques in generative adversarial networks (GAN). As a general matter, generative modeling involves using a model to generate new examples that plausibly come from an existing distribution of samples, such as generating new photographs that are similar but specifically different from a dataset of existing photographs. Thus, in this case, the deep generative model 250 can be trained with samples of accident and traffic images and other related data in order to simulate the event with reference to the incident-specific elements that have been identified.

In some other embodiments, the system 280 further includes or has access to a dynamic confidence scoring machine learning model ("dynamic scoring model") that can intelligently strengthen the reliability of the predictive model 232 over time or in response to feedback from end-users. In one embodiment, the dynamic scoring model comprises a deep reinforcement learning model ("model"). In some embodiments, the deep reinforcement learning process may use a Q-Learning process, Deep Q Network (DQN), a Double Deep Q Network (DDQN), or other kinds of deep learning networks. In one embodiment, if the generated simulation successfully and accurately represented the elements described in the source data, the model's is reinforced. For example, the app may request that the user submit feedback regarding their experience, including whether the simulation was aligned with their understanding of the collected source data. The feedback can be used to update the predictive model 232 to give more weight to one information component versus another information component. In some embodiments, a model confidence score can be assigned to each simulation that is generated based on the types of information components (see FIG. 1A) that were made available to the system and the weights that have been assigned to each type of information component. For example, sources such as witness reports may be initially associated with a lower weight compared to more impartial sources such as vehicle telemetry and photographs taken at the accident site, which can be automatically given greater credence and weight. Thus, in a case where only witness reports are available, without vehicle telemetry or other data, the simulation may be generated but assigned a lower confidence score (lower likelihood of accuracy or completeness) than a simulation that includes additional data sources. Similarly, weights assigned to a data source may be automatically adjusted if the data of a specific information component category is minimal, corrupted, abbreviated, unclear, or otherwise ambiguous. In one example, a witness report that is thorough in its description of the accident, includes details about the vehicle(s) involved, the injuries caused, has a consistent set of statements, etc. may be given more weight by the predictive model 232 that a witness report that is terse, superficial, and/or inconsistent or contradictory. These weights, when applied by the predictive model 232, will determine which elements should be more prominently depicted or presented by the simulation. Furthermore, in some embodiments, the confidence score can vary based upon the consistency of the data as a whole and/or conflicts of data between sources (see FIG. 9). Over time, based on reinforcement data via feedback of end-users, the predictive model 232 can learn which types of data and/or data values should be assigned more or less weight when determining the elements that should be included in the simulation.

In some other embodiments, not shown in FIGS. 2A and 2B, the system 280 further includes or has access to an injury predictive analysis model ("injury model"). In different embodiments, the injury model is configured to receive data from NLP 222 and/or keyword analysis module 224 in order to identify specific details that support a particular injury event or scenario for one or more persons involved in the accident. In other words, injury model is configured to determine what the most likely outcome (e.g., injury) should be based on the details or "story" received about what led to the accident. In some embodiments, to further assist in the predictive analyses, the injury model may include, or have access to, databases of relational information. For example, for a particular height, weight, age, and position in the vehicle of a person involved in the accident, as well as vehicle safety features that were included in the vehicle, the corresponding knowledge graph may include branches identifying the potential injury types. The injury model can access this type of information and generate an expected or most likely injury that should have resulted from the incident. In some embodiments, content including a description of the predicted injury may then be presented to an end-user. This output, along with the output of classifier model 260, can be shared as inputs with the deep generative model 250. Based on one or more of these inputs, deep generative model 250 may in some embodiments produce and present a depiction of the injury as overlaid on a pictorial representation of a generic person.

In some embodiments, an animation and model engine including one or more algorithms can be used to convert raw accident information into an animated video of an accident using any known methods in machine vision and/or machine learning more broadly in order to construct an animated video of the accident. In some cases, a separate artificial intelligence engine may be used to facilitate transforming the raw data into an animated video. In other cases, artificial intelligence and/or machine learning modules could be integrated into animation and model engine. As part of constructing an animated video, and/or in parallel, accident reconstruction system may also build a 3D model of the accident. This model could be static or dynamic. In some cases, deep generative model 250 may output both an animated video of the accident, and a static and/or 3D model of the accident. In some cases, the simulation 252 could be interactive, allowing the user to adjust parameters and/or move parts of the model to better understand the accident. In some embodiments, the generative process may occur via a remote server configured with sufficiently similar algorithms that are used to generate animated videos from raw or processed accident data.

In different embodiments, once the simulation is generated, it may be presented to a user of a computing device to facilitate review of the accident, for example via a user interface for the system application. In some embodiments, the simulation may be transmitted from a remote server where some or all components of the system reside. In some cases, the user could be a representative, such as for an insurance company that provides coverage for the vehicle. In some cases, upon receiving the simulation of the accident, the representative could call the claimant to review the simulation and gather any additional relevant information or clarifying details. In some embodiments, the simulation could be sent to other parties. As one example, the simulation could be sent to a repair facility to provide a visual image of the type of damage expected for the vehicle prior to its arrival at the repair facility. This process of reviewing a simulation of an accident based on may provide increased accuracy for reporting accidents over alternative methods that rely on reviewers to collect data from various sources and integrate the information manually. In other embodiments, the simulation could be automatically analyzed to retrieve relevant analytic data without the need for a manual review.

As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some embodiments, predictive model 232 and deep generative model 250 can also work with an inconsistency detector model 240, which is configured to compare details of the simulation with the predicted outcome. In some embodiments, the inconsistency detector model 240 is configured to determine whether there is a high likelihood that a specific data item (e.g., witness report, police report, etc.) is unreliable because of the variations detected between the damage description communicated by the data and the predicted damage as determined by predictive model 232. In cases where the comparison appears to make the simulation 252 unrealistic, and/or other discrepancies are detected, the system 280 can be configured to automatically generate an alert via alert module 242. The alert can be presented via the app 292 in some embodiments, for example as notifications 294. In other embodiments, the alert can trigger a notification to be more directly communicated to a user via email, text, pop-up windows, etc.

Figure 3:
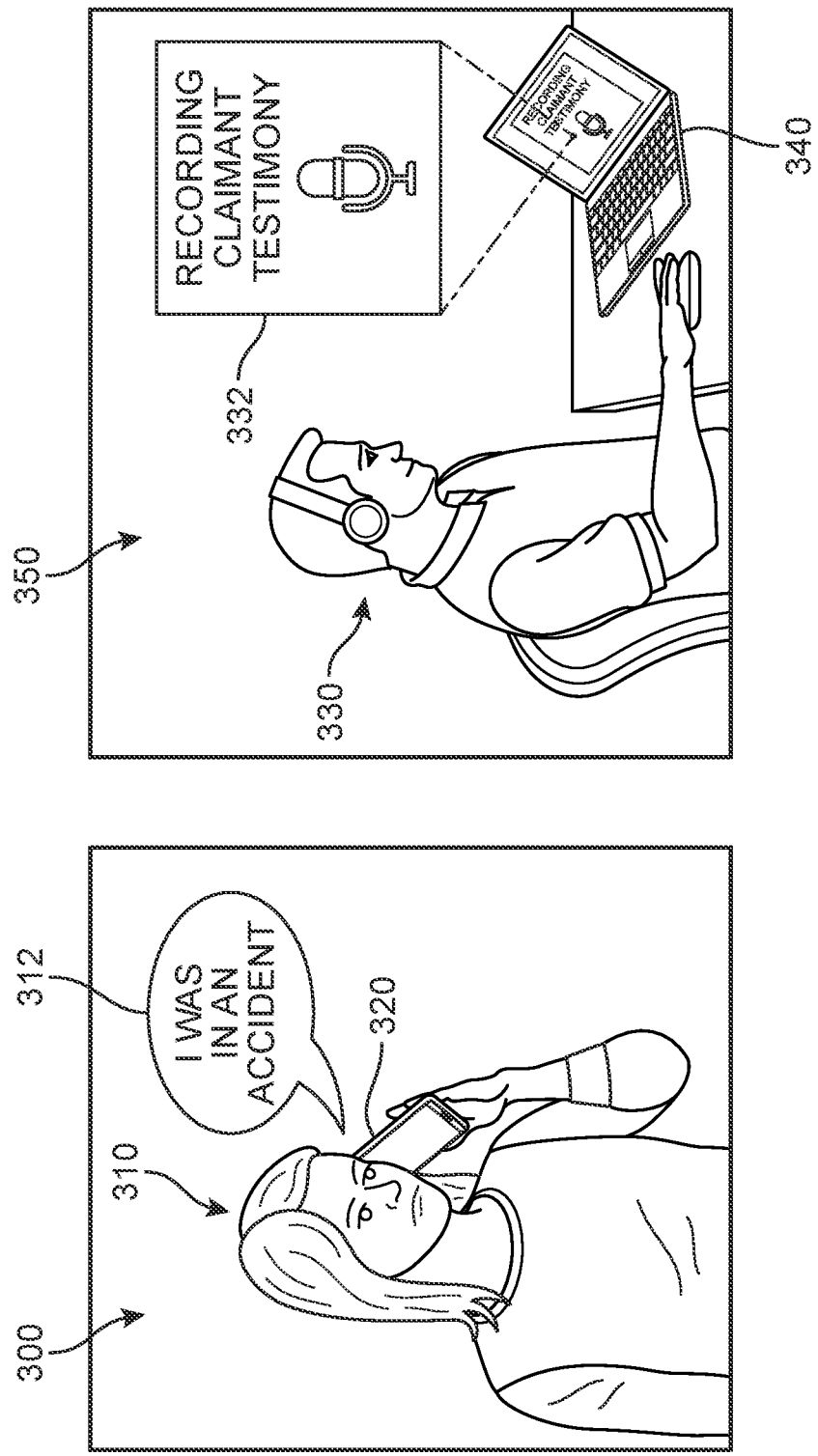
FIG. 3 is an illustration of a scenario in which a claimant provides testimony of an accident to a third-party, according to an embodiment.
Figure 4:
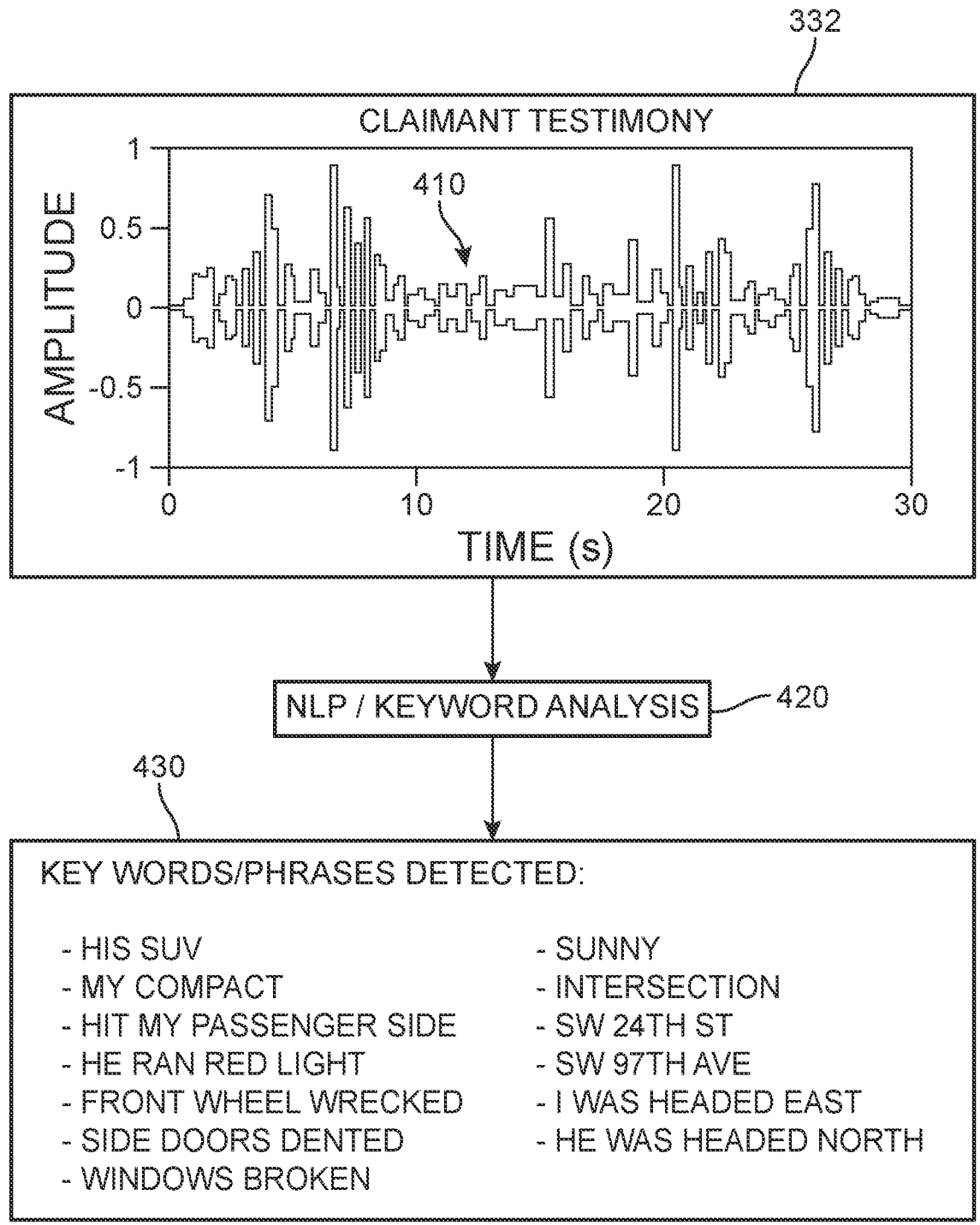
FIG. 4 is a schematic view of an audio recording of the testimony of FIG. 3 and keywords identified by a keyword model, according to an embodiment.
Figure 5:
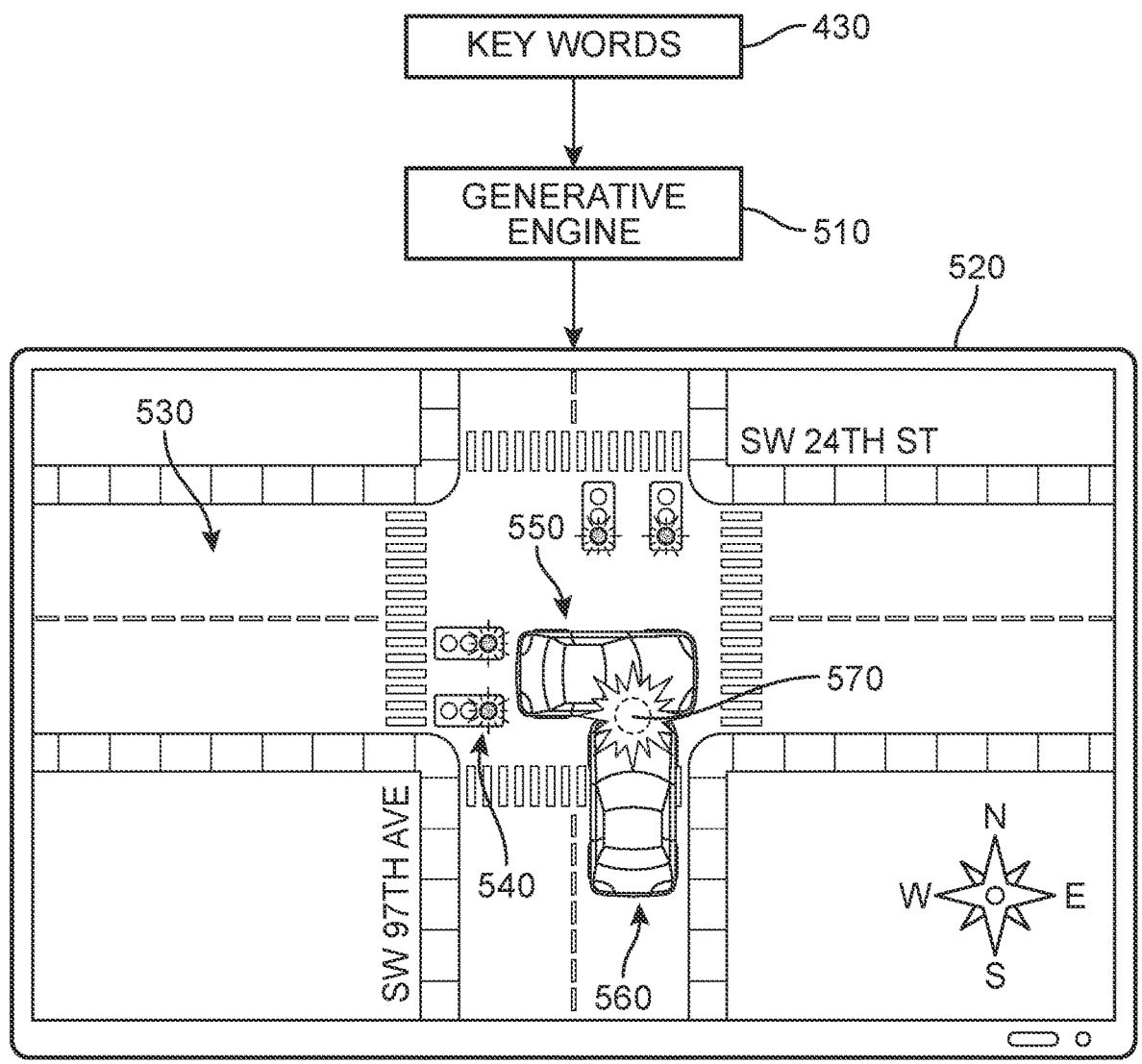
FIG. 5 is a schematic view of an embodiment of an accident simulation in which two cars collided.

Referring now to FIGS. 3-5, an example of a scenario in which an embodiment of the proposed systems may be implemented is shown. In FIG. 3, a driver 310 is shown contacting an insurance representative 330 regarding an accident. The driver 310 may be located at a first location 300, such as at the scene of the accident, while the representative 330 is at a call center or other remote location. As the driver 310 speaks and describes the accident as verbal data 312 via her smartphone 320, a computing device 340 for representative 330 records the audio as claimant testimony 332.

As noted earlier, in one embodiment, the system may include one or more machine learning models that are used to automatically analyze claimant testimony about an accident. The system can further include NLP engines to automatically detect keywords from audio of the testimony. An example of this process is illustrated in FIG. 4, where a sample waveform 410 representing the audio of the claimant testimony 332 is depicted. As noted above, as the audio data is processed and sent to an NLP/keyword analysis engine 420, one or more words may be extracted or otherwise tagged as being of higher relevance based on the training sample. In different embodiments, the training sample may comprise data from a large repository of previously documented accidents and their corresponding labels (e.g., supervised learning) that have been provided to the machine learning model, such that the model identifies which words are relevant for each type of accident. In this case, keywords 430 or phrases that have been detected include "His SUV", "My compact", "Hit my passenger side", "He ran red light", "Front wheel wrecked", "Side doors dented", "Windows broken", "Sunny", "Intersection", "SW24$^{th}$ ST", "SW97$^{th}$ AVE", "I was headed east", and "He was headed north". It should be understood that the keywords 430 are included as an example only, and other keywords may be included or identified.

Figure 6:
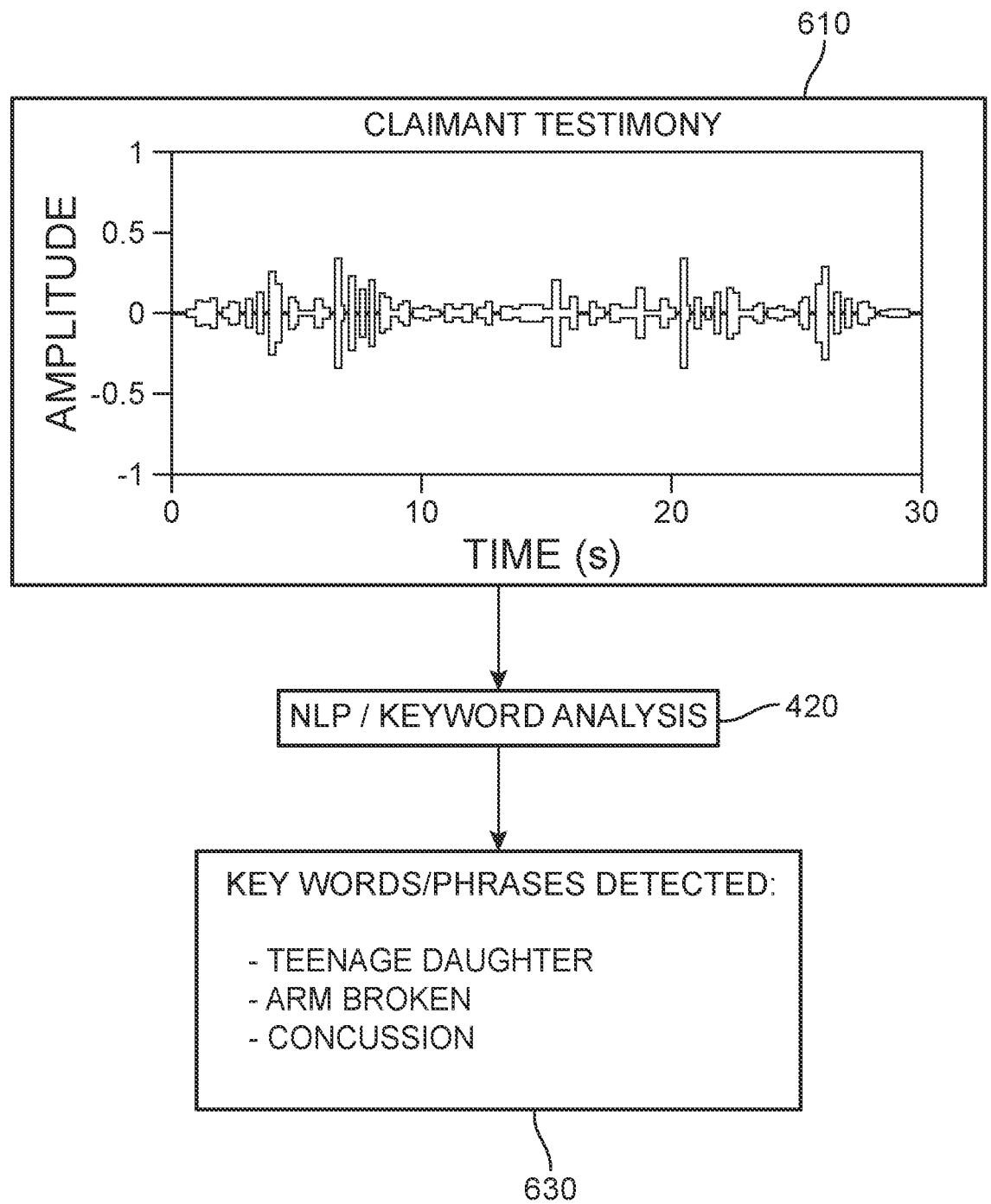
FIG. 6 is a schematic view of an audio recording of additional testimony and keywords identified by a keyword model, according to an embodiment.
Figure 7:
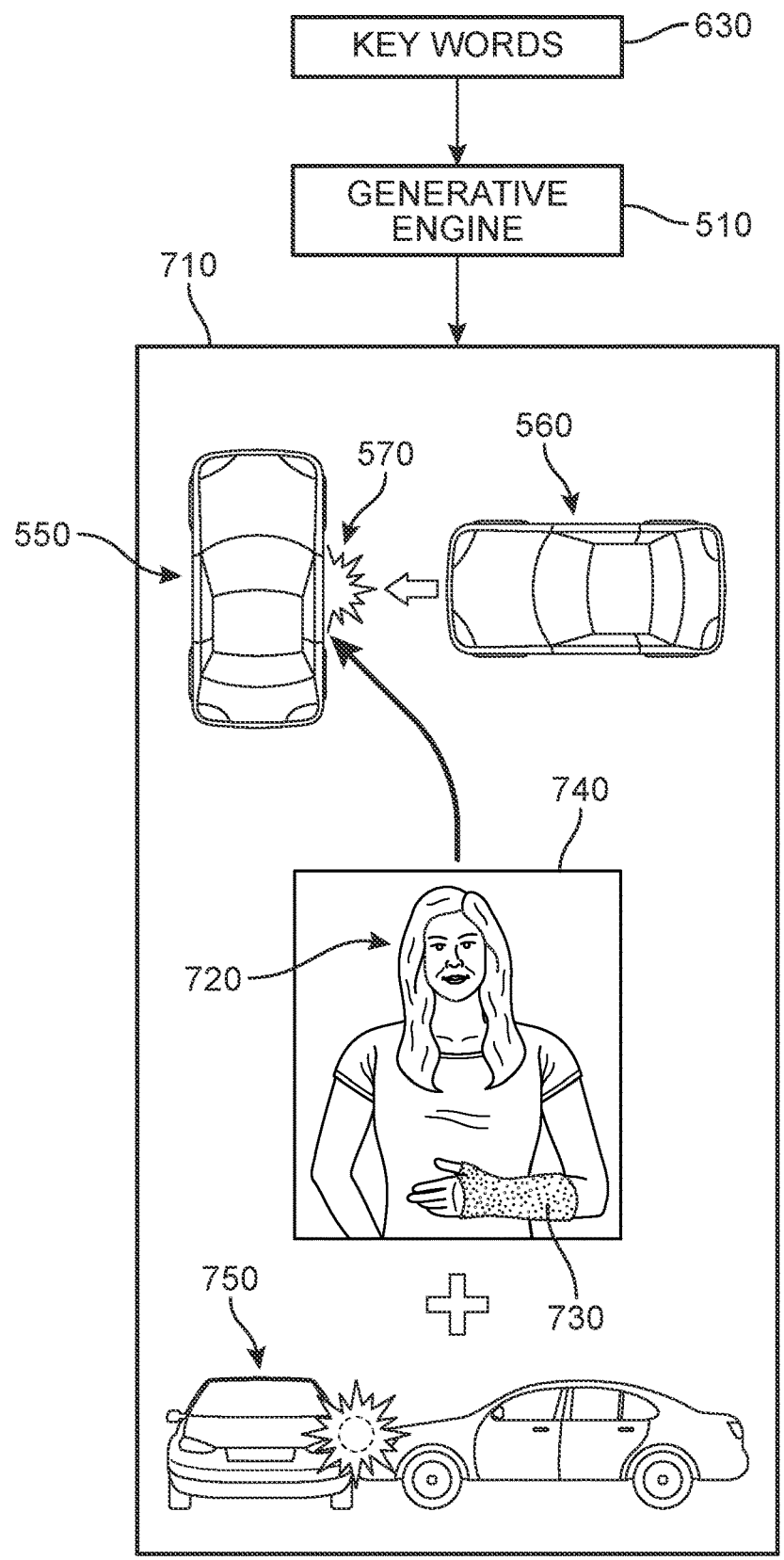
FIG. 7 is a schematic view of an embodiment of an accident simulation including injury to a vehicle occupant.

Referring next to FIG. 5, these keywords 430 as well as other data can then be fed to a generative engine 510 that can automatically generate 2D or 3D images of elements, such as vehicles 550 and 560, roads 530, traffic signs 540, damage 570, etc. to produce a visual rendering or simulation 520 for viewing by an end-user. In some other examples, drivers, passengers, and other aspects of the vehicles and environment can be depicted. Thus, in some embodiments, the system can automatically arrange the elements in space based on keyword analysis, thereby rendering a schematic scene of the accident according to the testimony. In one embodiment, the generative engine can also include damage done to the vehicle(s) following the collision. In some cases, the scene generated could be animated and/or otherwise dynamic. For purposes of illustration and clarity, the drawing depicts an accident simulation as viewed from above. However, in other embodiments, the accident could be rendered from any other viewpoint, such as the driver's viewpoint, an external viewpoint or any other viewpoint. In some cases, a model is generated first, and then the model may be rendered from a particular view to create the simulation.

in different embodiments, the system can be configured to further generate data representing injuries to the claimant or others involved in the accident based on key word analysis. FIGS. 6 and 7 present an additional example in which other types of accident-related details may be characterized by the system. In FIG. 6, additional claimant testimony 610 has been collected from the driver of FIG. 3. As discussed earlier, as the audio data is processed and sent to an NLP/keyword analysis engine 420, one or more words may be extracted or otherwise tagged as being of higher relevance based on the training sample. In this case, the example keywords 630 or phrases that have been detected include "Teenage daughter", "arm broken", and "concussion". In FIG. 7, these keywords 630 as well as other data can then be fed to generative engine 510 that can automatically produce additional 2D or 3D images of elements in the context of the previous information, in this case providing a new simulation element 740 that depicts a woman 720 with a broken arm 730. In some embodiments, the accident may also be shown in a different perspective 750 to better illustrate how such an injury might have occurred or is described as occurring. In some other examples, the injury data can be compared to the predictive model data to see if the injuries are consistent with the damage done to the vehicle. In one example, the system could simulate an occupant in the vehicle during the collision, based on the model, and determine likely injuries that may occur. If the claimant's purported injuries do not match any injuries on this list, the system could recommend further investigation by a human investigator (e.g., see FIG. 9).

Figure 8:
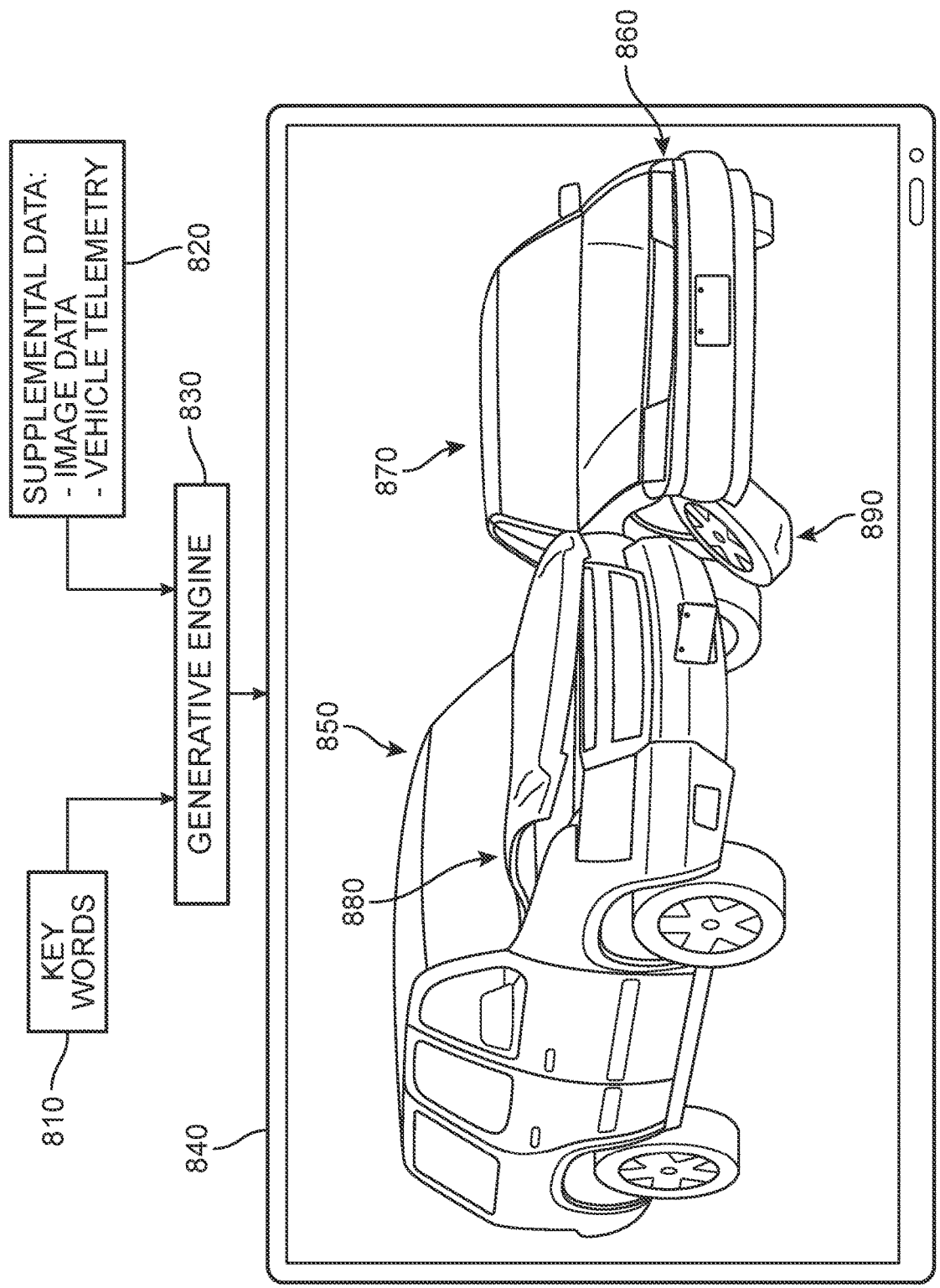
FIG. 8 is a schematic view of an embodiment of a 3D model of an accident.

As noted earlier, as additional data is inputted into the system, further details may be produced by the generative engine. One example is presented in FIG. 8, where a more comprehensive simulation 840 is generated by a generative engine 830 based on both keywords 810 and supplemental data 820 that in this case includes image data, witness testimony, vehicle telemetry, etc. As a result, the simulation 840 can depict more detailed aspects such as a first vehicle type 850 (an SUV) and a second vehicle type 860 (a sedan), a specific area 880 of the hood in the first vehicle that was damaged, tire damage 890 to the second vehicle, and a more precise collision region 870 between the vehicles. Thus, the system can be configured to depict not just simplified representations, but more realistic depictions that can offer a reviewer greater insight and clarity regarding the incident.

Figure 9:
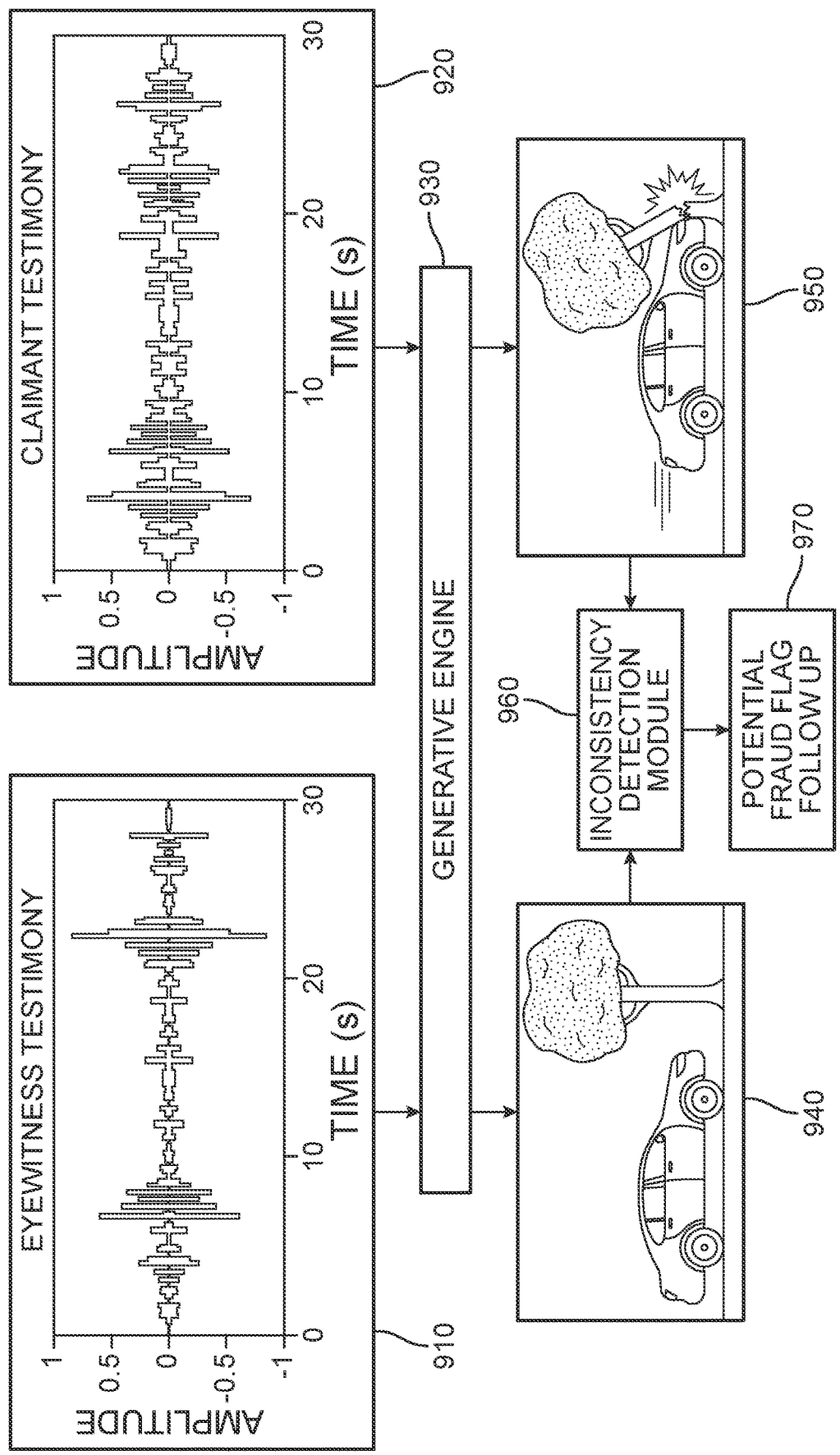
FIG. 9 is a schematic view of an implementation of an inconsistency detection model, according to an embodiment.

In some embodiments, the system may also be configured to generate models from two different testimonies. In such cases, the system can compare the two models of the accident and detect inconsistencies in the testimony of the two reporters. An example of such a process is illustrated in FIG. 9, where an eyewitness testimony 910 and a claimant testimony 920 are both received by the system and independently processed to generate two separate simulations. In this case, a generative engine 930 produces a first simulation 940 based on the content of eyewitness testimony 910, and a second simulation 950 based on the content of claimant testimony 920. It may be appreciated that each simulation differs. For example, in first simulation 940, the vehicle remains spaced apart from the tree, while in the second simulation 950 the vehicle speeds into the tree. An inconsistency detection module 960 can detect such inconsistencies and determine whether the they can be attributable to minor discrepancies between the reports. More specifically, in some embodiments, the inconsistency detection module 960 can be configured to compare and contrast the two generated images (e.g., simulated video clips) from each source. In one embodiment, the inconsistency detection module 960 can compare two (or more) videos that were each generated based on a distinct source in order to detect differences between the data. For example, the inconsistency detection module 960 can review the videos frame-by-frame in order to identify events or other details that do not match and thereby indicate an inconsistency. In further examples, audio associated with each video can be compared to detect inconsistencies, as well as speed of a vehicle, vehicle damage, passengers and injuries, weather, roadway conditions, vehicle models, colors, and other aspects of the accident that may be described by various sources as described above. In some embodiments, if a first video is shorter or longer than a second video for the same accident, the AI model will automatically align the data of each so that the shorter video's playback matches the longer video's playback of the same time period (i.e., compare them in the segment where they overlap in the timeline of the accident). This can allow the videos to be more accurately compared frame-by-frame.

In the example shown in FIG. 9, the inconsistency detection module 960 determines the inconsistency between the two simulations is greater than an acceptable threshold, and automatically generates an alert 970 flagging the discrepancy for follow up as a potential fraud. Thus, in different embodiments, the system is configured to reduce the likelihood of fraud. In other embodiments, such as when the reports are consistent, the system could integrate the testimonies of multiple people to improve the accuracy of models of the accident. In some embodiments, the system could also be configured to infer fault based on the model of the collision and present its assessment to the reviewer. In different embodiments, insurance or other damage-related claims may be proactively created based on the three-dimensional representation.

Figure 10:
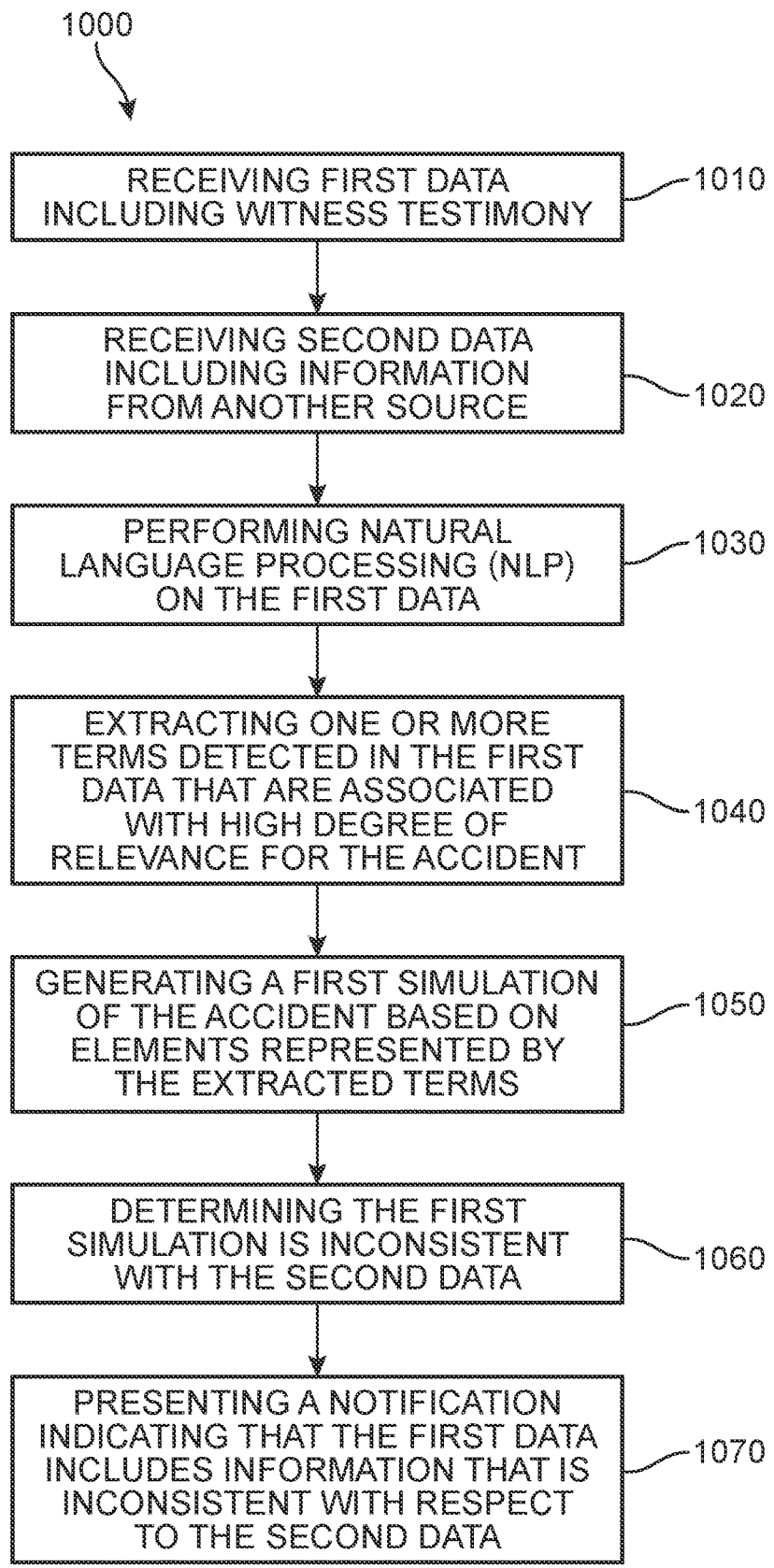
FIG. 10 is a flow diagram of a process of computer-implemented method for generating a computer-implemented simulation of aspects of a vehicle accident, according to an embodiment.

FIG. 10 is a flow chart illustrating an embodiment of a computer-implemented method 1000 for generating a computer-implemented simulation of aspects of a vehicle accident. The method 1000 includes a first step 1010 of receiving first data including a testimony of a witness to the accident and a second step 1020 of receiving second data including information about the accident from a source other than the witness. A third step 1030 includes performing natural language processing (NLP) on the first data. A fourth step 1040 includes providing the processed first data to a keyword machine learning model to extract one or more terms detected in the first data that are associated with high degree of relevance for the accident. In addition, the method 1000 includes a fifth step 1050 of feeding the extracted terms to a generative engine to generate a first simulation of the accident based on elements represented by the extracted terms. A sixth step 1060 includes determining a first feature of the first simulation is inconsistent with information included in the second data, and a seventh step 1070 includes causing, via a software application, a notification to be presented indicating that the first data includes information that is inconsistent with respect to the second data.

In other embodiments, the method may include additional steps or aspects. In some embodiments, the method also includes steps of causing the first simulation to be presented via a user interface for the application, receiving, via the user interface, a first user input for interacting with a first graphical element of the first simulation, and presenting, in response to the first user input and via the user interface, additional details related to the first graphical element. In another example, the second data includes one or more of vehicle telemetry for a vehicle involved in the accident, a police report of the accident, and image data showing aspects of the accident. In some embodiments, the method can also include generating a second simulation of the accident based only on information extracted from the second data. In one example, the first simulation includes an interactive 3D model of the accident.

In addition, in some cases, the determination that the first feature has a high likelihood of being inconsistent with information included in the second data is based on a comparison of synthetic data from the first simulation and synthetic data from the second simulation, where the synthetic data was created in order to and/or as a result of generating each of the simulations. In another example, the method also includes a step of generating a second simulation of the accident based on information extracted from both the first data and the second data, where the second simulation includes a greater number of graphical elements relative to the first simulation due to the increased amount of detail available when the two sources of data are pooled together. In one embodiment, the first simulation includes an animated video showing a vehicle of a model that was involved in a collision during the accident and its estimated position directly prior to the collision.

In different embodiments, the method may also include steps of providing the first data to a predictive model, determining, via the predictive model, predicted damage to a vehicle that should have resulted from the accident based on the information included in the first data, and presenting, via the application, content describing or depicting the predicted damage. In such cases, the content can include a depiction of the predicted damage overlaid on a pictorial representation of a vehicle. In some other embodiments, the method further includes steps of providing the first data and the predicted damage to an inconsistency detection model, determining, via the inconsistency detection model, that damage communicated by the first data has a high likelihood of unreliability, and automatically presenting, via the application, an alert indicating the high likelihood of unreliability associated with the first data.

In some embodiments, the method may also include steps of providing the first data to a predictive model, determining, via the predictive model, a predicted injury to a person that should have resulted from the accident based on the information included in the first data, and presenting, via the application, content describing or depicting the predicted injury. In such cases, the content can include a depiction of the predicted injury overlaid on a pictorial representation of a person. In another example, the method can then also include steps of providing the first data and the predicted injury to an inconsistency detection model, determining, via the inconsistency detection model, that injury communicated by the first data has a high likelihood of unreliability, and automatically presenting, via the application, an alert indicating the high likelihood of unreliability associated with the first data.

In some other embodiments, the first simulation includes a first animated video depicting a first reconstruction of the accident. In such cases, the method may also include steps of generating a second simulation of the accident based on information extracted from the second data, the second simulation including a second animated video depicting a second reconstruction of the accident, providing the first animated video and the second animated video to an inconsistency detection model, determining, via the inconsistency detection model, that one or more elements in the first animated video are inconsistent relative to one or more elements in the second animated video, and automatically presenting, via the application, an alert indicating a high likelihood of unreliability associated with either or both of the first data and the second data.

Other methods can also be contemplated within the scope of this disclosure. For example, a computer-implemented method of determining a likelihood of reliability (or unreliability) of witness testimony of an accident (in order to, for example, detect fraudulent testimony or unintentional mistakes) is disclosed. The method includes a first step of receiving first data including a testimony of a witness to the accident, the testimony describing damage incurred by a vehicle involved in the accident, and a second step of providing the first data to a predictive model. A third step includes determining, via the predictive model, predicted damage to a vehicle that should have resulted from the accident based on the information included in the first data, and a fourth step includes providing the first data and the predicted damage to an inconsistency detection model. In addition, the method includes a fifth step of determining, via the inconsistency detection model, that vehicle damage communicated by the first data has a high likelihood of unreliability, and a sixth step of causing, via an application, an alert to be presented indicating the high likelihood of unreliability associated with the first data.

In other embodiments, the method may include additional steps or aspects. In some embodiments, the method also includes presenting, to the user, content describing or depicting the predicted damage. In such cases, the content can include a depiction of the predicted damage overlaid on a pictorial representation of a vehicle (e.g., a generic vehicle of the same vehicle type as the one involved in the accident).

Thus, as described herein, the disclosed embodiments can provide critical insights to insurance companies, claimants, drivers, and other third parties about an accident, including perspective regarding the specific portions of the vehicle that were damaged and the extent of damage at each portion, allowing for a more accurate estimate of repair. The system includes provisions for receiving data about the accident, and processing that information to build 3D models and/or animated videos of an accident (such as a collision). This type of data collection, analysis, and visualization can provide essential information to insurers and expedite the processing of claims for insured members.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A computer-implemented method of identifying inconsistencies between different sources of data for a vehicle accident, the method comprising:
   receiving first data including a testimony of a witness to the accident;
   receiving second data including information about the accident from a source other than the witness;
   performing natural language processing (NLP) on the first data;
   providing the processed first data to a keyword machine learning model to extract one or more terms detected in the first data that are associated with high degree of relevance for the accident;
   feeding the extracted terms to a generative engine to generate a first simulation of the accident based on elements represented by the extracted terms, wherein the first simulation includes a first animated video depicting a first reconstruction of the accident;
   generating a second simulation of the accident based on information extracted from the second data, the second simulation including a second animated video depicting a second reconstruction of the accident;
   providing the first animated video and the second animated video to an inconsistency detection model;
   determining, via the inconsistency detection model, that one or more elements in the first animated video are inconsistent relative to one or more elements in the second animated video; and
   automatically presenting, via an application, an alert indicating a high likelihood of unreliability associated with either or both of the first data and the second data.

2. The method of claim 1, further comprising:
   causing the first simulation to be presented via a user interface for the application;
   receiving, via the user interface, a first user input for interacting with a first graphical element of the first simulation; and
   presenting, in response to the first user input and via the user interface, additional details related to the first graphical element.

3. The method of claim 1, wherein the second data includes one or more of vehicle telemetry for a vehicle involved in the accident, a police report of the accident, and image data showing aspects of the accident.

4. The method of claim 3, wherein the determination that the first feature has a high likelihood of being inconsistent with information included in the second data is based on a comparison of synthetic data from the first simulation and synthetic data from the second simulation.

5. The method of claim 1, further comprising:
   generating a third simulation of the accident based on information extracted from both the first data and the second data, the third simulation including a greater number of graphical elements relative to either the first simulation and second simulation.

6. The method of claim 1, wherein the first simulation includes an interactive 3D model of the accident.

7. The method of claim 1, wherein the second simulation includes a different number of graphical elements relative to the first simulation.

8. The method of claim 1, further comprising:
   providing the first data to a predictive model;
   determining, via the predictive model, predicted damage to a vehicle that should have resulted from the accident based on the information included in the first data; and
   presenting, via the application, content describing or depicting the predicted damage.

9. The method of claim 8, wherein the content includes a depiction of the predicted damage overlaid on a pictorial representation of a vehicle.

10. The method of claim 1, further comprising:
    providing the first data to a predictive model;
    determining, via the predictive model, a predicted injury to a person that should have resulted from the accident based on the information included in the first data; and
    presenting, via the application, content describing or depicting the predicted injury.

11. The method of claim 10, wherein the content includes a depiction of the predicted injury overlaid on a pictorial representation of a person.

12. A system for generating a computer-implemented simulation of aspects of a vehicle accident, the system comprising a processor and machine-readable media including instructions which, when executed by the processor, cause the processor to:
    receiving first data including a testimony of a witness to the accident;
    receiving second data including information about the accident from a source other than the witness;
    perform natural language processing (NLP) on the first data;
    provide the processed first data to a keyword machine learning model to extract one or more terms detected in the first data that are associated with high degree of relevance for the accident;
    feed the extracted terms to a generative engine to generate a first simulation of the accident based on elements represented by the extracted terms, wherein the first simulation includes a first animated video depicting a first reconstruction of the accident;
    generate a second simulation of the accident based on information extracted from the second data, the second simulation including a second animated video depicting a second reconstruction of the accident;
    provide the first animated video and the second animated video to an inconsistency detection model;
    determine, via the inconsistency detection model, that one or more elements in the first animated video are inconsistent relative to one or more elements in the second animated video; and
    automatically present, via an application, an alert indicating a high likelihood of unreliability associated with either or both of the first data and the second data.

13. The system of claim 12, wherein the first simulation includes an interactive 3D model of the accident.

14. The system of claim 12, wherein the instructions further cause the processor to:
provide the first data to a predictive model;
determine, via the predictive model, predicted damage to a vehicle that should have resulted from the accident based on the information included in the first data; and
present, via the application, content describing or depicting the predicted damage.

15. The system of claim 12, wherein the instructions further cause the processor to:
provide the first data to a predictive model;
determine, via the predictive model, a predicted injury to a person that should have resulted from the accident based on the information included in the first data; and
present, via the application, content describing or depicting the predicted injury.

16. The system of claim 15, wherein the content includes a depiction of the predicted injury overlaid on a pictorial representation of a person.

17. The system of claim 12, wherein the second simulation includes a greater number of graphical elements relative to the first simulation.

18. The system of claim 12, wherein the instructions further cause the processor to:
cause the first simulation to be presented via a user interface for the application;
receive, via the user interface, a first user input for interacting with a first graphical element of the first simulation; and
present, in response to the first user input and via the user interface, additional details related to the first graphical element.

19. The system of claim 12, wherein the second data includes one or more of vehicle telemetry for a vehicle involved in the accident, a police report of the accident, and image data showing aspects of the accident.

20. The system of claim 14, wherein the content includes a depiction of the predicted damage overlaid on a pictorial representation of a vehicle.

* * * * *